(12) United States Patent
Won et al.

(10) Patent No.: US 7,983,568 B2
(45) Date of Patent: Jul. 19, 2011

(54) APPARATUS AND METHOD FOR VISIBLE LIGHT COMMUNICATION

(75) Inventors: Eun-Tae Won, Seoul (KR); Jae-Seung Son, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 755 days.

(21) Appl. No.: 11/972,710

(22) Filed: Jan. 11, 2008

(65) Prior Publication Data

US 2008/0170863 A1    Jul. 17, 2008

(30) Foreign Application Priority Data

Jan. 15, 2007  (KR) .................. 10-2007-0004243

(51) Int. Cl.
*H04B 10/00*    (2006.01)
(52) U.S. Cl. .................. 398/172; 398/183; 398/198
(58) Field of Classification Search .................. 398/158, 398/162, 167, 172, 182, 193, 195, 198, 79, 398/183, 186, 187
See application file for complete search history.

(56) References Cited

U.S. PATENT DOCUMENTS 7,725,033 B2 * 5/2010 Nakamoto ...................... 398/95
2006/0239689 A1 * 10/2006 Ashdown ...................... 398/130

FOREIGN PATENT DOCUMENTS

JP    2006-262458    9/2006

* cited by examiner

*Primary Examiner* — M. R. Sedighian
(74) *Attorney, Agent, or Firm* — Cha & Reiter, LLC

(57) ABSTRACT

Disclosed are an apparatus and a method for visible light communication, which apparatus uses an illuminator equipped with a plurality of light sources, so that the apparatus can be used for illumination, as well as for visible light communication. The visible light communication apparatus includes an illuminator for generation of the illumination light, the illuminator including a plurality of light sources with luminescence center wavelengths on mutually different visible regions; a communication amount adjuster for receipt of the plurality of communication data signals, and generation of each dummy data so that data to be transmitted through each of the plurality of LEDs has an equal communication amount; and a modulator for receipt of the plurality of communication data signals and their corresponding dummy data, and modulation of the received communication data signals and their corresponding received dummy data into driving signals for a plurality of LEDs configured as a light source.

10 Claims, 3 Drawing Sheets

APPARATUS AND METHOD FOR VISIBLE LIGHT COMMUNICATION

CLAIM OF PRIORITY

This application claims the benefit under 35 U.S.C. §119(a) of an application entitled "Apparatus and Method for Visible Light Communication," filed in the Korean Intellectual Property Office on Jan. 15, 2007 and assigned Serial No. 2007-4243, the entire contents of which are hereby incorporated by reference.

BACKGROUND OF THE INVENTION

1. Field of the Invention

The present invention relates to an apparatus for visible light communication and a method for visible light communication using the same, and more particularly to an apparatus and a method for visible light communication using a Light Emitting Diode (LED) light source which emits visible light.

2. Description of the Related Art

A visible light communication apparatus refers to a system for wirelessly transmitting data by means of LED-based lamps such as an interior/exterior illumination lamp, a signboard lamp, a traffic light, a road lamp, etc. Such a visible light communication apparatus is applicable to places, such as a hospital and an airplane, where use of an RF system is limited, and the visible light communication apparatus can also provide additional information services using an electronic display board.

A white LED has typically been used for an illumination function. Such white LEDs include a combination of blue LEDs and yellow phosphor, a combination of UV LED and RGB Phosphor, a combination of RGB LEDs (LEDs of Red, Green, and Blue), etc. In these LEDs, the RGB LED has been the preferred choice since it is possible to transmit different data through each channel of R, G, and B. Theoretically white light radiation can be achieved by using at least ten colors. In this case, it is possible to transmit data through at least ten independent channels.

However, when channels of R, G, and B convey data having different lengths, white light is not emitted even through concentration of three lights of R, G, and B. As a result, the transmitted lights lose their original function for illumination.

SUMMARY OF THE INVENTION

Accordingly, the present invention provides an apparatus and a method for visible light communication, which uses an illuminator equipped with a plurality of light sources, so that the apparatus can be used for illumination, as well as for visible light communication.

In accordance with an embodiment of the present invention, there is provided a visible light communication apparatus for transmitting a plurality of communication data signals by using illumination light, the visible light communication apparatus including: an illuminator for generating the illumination light, the illuminator including a plurality of light sources with luminescence center wavelengths on mutually different visible regions; a communication amount adjuster for receiving the plurality of communication data signals, and generating a dummy data for each so that data to be transmitted through each of the plurality of light sources has an equal communication amount; and a modulator for receiving the plurality of communication data signals and the dummy data for each of the plurality, and modulating the received communication data signals and the received dummy data into driving signals for the plurality of light sources.

The light source includes a red LED, a green LED, and a blue LED.

In accordance with another embodiment of the present invention, there is provided a visible light communication method for transmitting a plurality of communication data signals by using an illuminator including a plurality of individual light sources as a plurality of channels, the visible light communication method including the steps of: (1) adjusting a communication amount by adding a dummy data to each channel of the plurality so that each input data to be transmitted by using the plurality of individual light sources as the plurality of channels has an equal communication amount; and (2) modulating data of each channel having the added dummy data and providing the modulated data as driving signals of the plurality of individual light sources, so that the illuminator can emit white light.

It is preferred that step (1) is not performed when a measured data rate of each input data to be transmitted by using the plurality of individual light sources as channels is higher than or equal to a threshold data rate above which it is impossible to recognize the unbalancing of R, G, and B by the naked eye, and step (1) is performed when the data rate of each input data is lower than the threshold data rate. It is also preferred that step (1) further includes the steps of: determining a proper communication amount of each input data based on the measured data rate of each input data; measuring a real data amount of each input data to be transmitted by using the plurality of individual light sources as channels; and transmitting directly data without any additional handling when a channel has the real data amount identical with the proper communication amount after comparing the real data amount with the proper communication amount, and transmitting data by adding dummy data having the same amount as a difference between the real data amount and the proper communication amount to a channel when a channel has the real data amount different from the proper communication amount according to the comparison.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PRESENT INVENTION

Hereinafter, an exemplary embodiment of the present invention is described with reference to the accompanying drawings. For the purposes of clarity and simplicity, a detailed description of known functions and configurations incorporated herein is omitted as it may make the subject matter of the present invention rather unclear.

Figure 1:
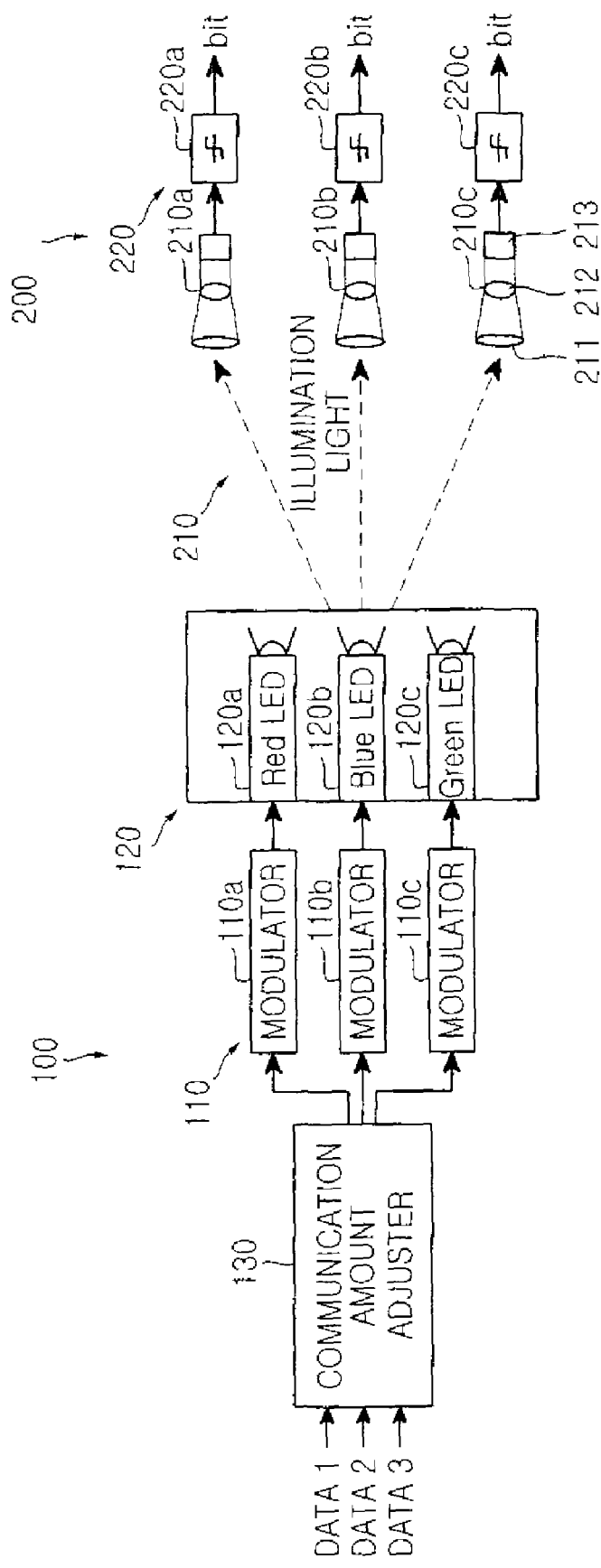
FIG. 1 is a block diagram illustrating a construction of an apparatus for visible light communication according to one embodiment of the present invention.

FIG. 1 is a block diagram illustrating a construction of an apparatus for visible light communication according to an exemplary embodiment of the present invention.

Referring to FIG. 1, the apparatus for visible light communication includes a transmitting side device 100 and a reception side device 200. Herein, the transmitting side device 100 includes a modulator 110, an illuminator 120, and a communication amount adjuster 130. Herein, the reception side device 200 includes a photoelectric converter 210 and a demodulator 220.

The modulator 110 modulates input data (data 1, data 2, and data 3) according to a scheme such as an On/Off Key (OOK) scheme, a Pulse Position Modulation (PPM) scheme, etc., and then provides the modulated data as a driving signal of the illuminator 120.

The illuminator 120 includes a plurality of monochromatic light sources 120a to 120c having luminescence center wavelengths on mutually different visible regions, and the illuminator 120 emits white light. Herein, the monochromatic light sources can be realized by LEDs having three primary colors (e.g. red, green, and blue). The white light for illumination includes colors of R, G, and B with predetermined energy ratios between them, which differ according to the LED manufacturer. The energy amount of each of R, G, and B LED for communication may change depending on a transmission data amount. If each channel conveys data having different lengths, white light is not emitted even through concentration of light emitted from R, G, and B LEDs. Therefore, in order to utilize the LEDs of R, G, and B as an illuminator for communication, it is necessary to equally maintain an energy amount of each LED by adjusting a transmission data amount. If LEDs of R, G, and B are used for light for illumination as well as light for communication, it is possible to transmit information three times as great as the information transmitted through a typical channel since information can be transmitted through each of R, G, and B channel.

The communication amount adjuster 130 endows each of R, G, and B channels with an equal communication amount, and equally maintains ratios of whole LED radiation so that white light can be emitted. The communication amount adjuster 130 measures a difference of the relative communication amount between each of the R, G, and B channels, and then transmits dummy data on each channel having the same amount as the measured difference.

The photoelectric converter 210 for converting light received from the illuminator into an electrical signal includes a lens 211, an optical filter 212, and a photoelectric element 213. The lens 211 concentrates received light to make an optical image on the optical filter 212, and the optical filter 212 passes only visible light while blocking ultraviolet light and infrared light from among light that enters through the lens 211. In the case of visible light communication using LEDs of R, G, and B, the optical filter 212 passes only a pattern of specific color (R, G, and B), and allows the photoelectric element to react to only a color of each channel. The photoelectric element 213 is a device for converting the intensity of light that enters through the optical filter into a flow of electricity, and the photoelectric element 213 includes a photo diode, a photo transistor, etc.

The demodulator 220 demodulates the input data (data 1, data 2, and data 3) from the illumination light which is photoelectrically converted by the photoelectric converter 210.

Hereinafter, an operation of a visible light communication apparatus having the above-described construction is described, said apparatus being configured according to the present invention.

Referring now to FIG. 1, respective data (data 1, data 2, and data 3) input from the outside are input to the communication amount adjuster 130. The communication amount adjuster 130 measures a difference of a data communication amount, which is to be transmitted through each of R, G, and B channels, and adds dummy data having the same amount as the measured difference to each channel to transmit the resulting data to the modulator 110.

Figure 2:
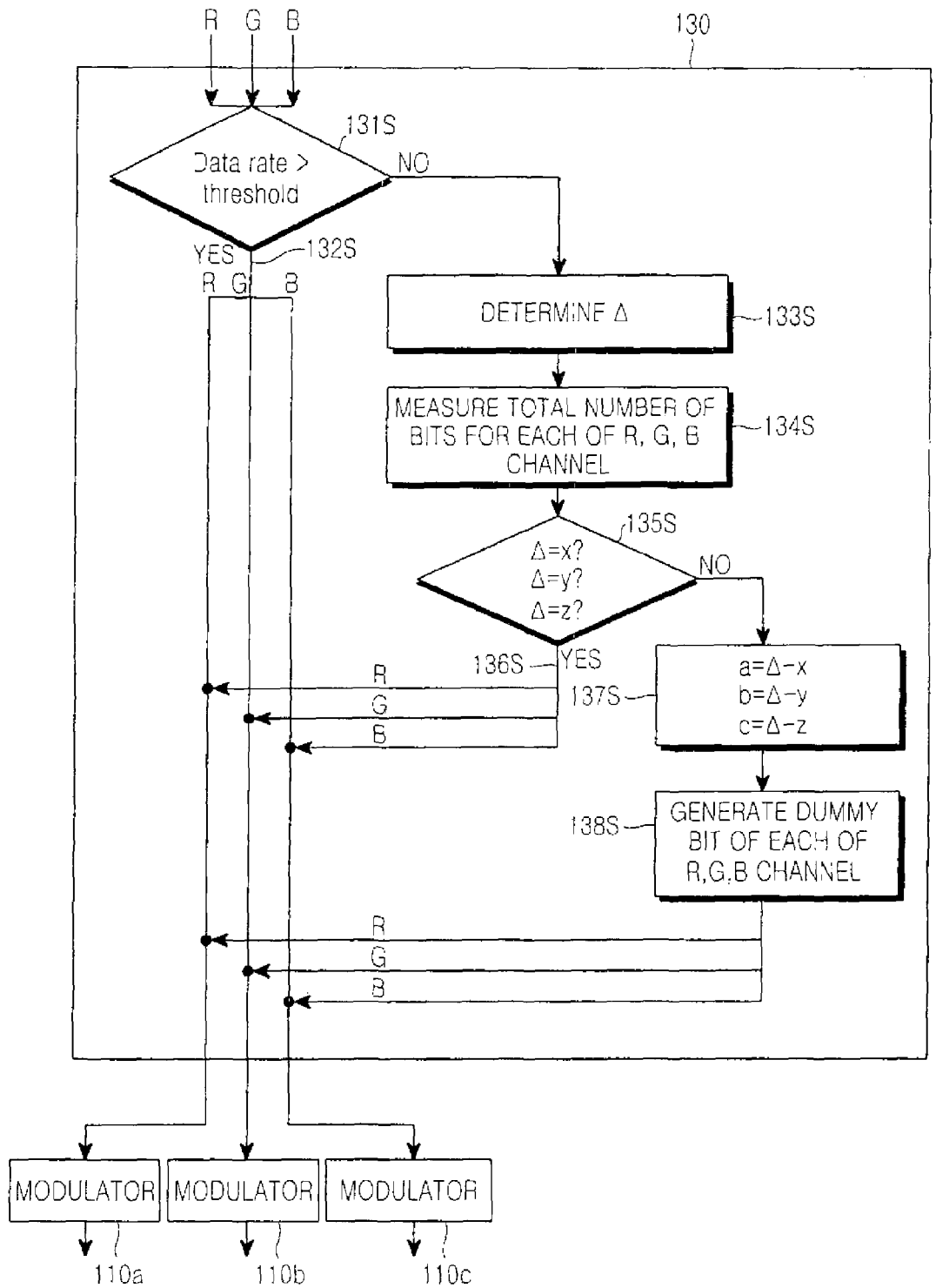
FIG. 2 is a flow diagram illustrating an operation of a communication amount adjuster according to the present invention.

FIG. 2 is a view illustrating an operation of a communication amount adjuster 130 according to the present invention. Hereinafter, the operation of the communication amount adjustment performed by the communication amount adjuster 130 is described in detail with reference to FIG. 2.

The communication amount adjuster 130 measures a data rate based on input data of each of R, G, and B channels, in step 131S. If the measured data rate is higher than a threshold data rate, unbalancing of R, G, and B is not recognized through the naked eye. Therefore, respective input data are input to the modulators 110a to 110c without any additional handling, in step 132S. Herein, the threshold data rate corresponds to a specific data rate, above which it is impossible to recognize the unbalancing of R, G, and B by the naked eye, and the threshold data rate may change depending on physical properties of LEDs. If the data rate is lower than the threshold data rate, the following process is performed.

Figure 3A:
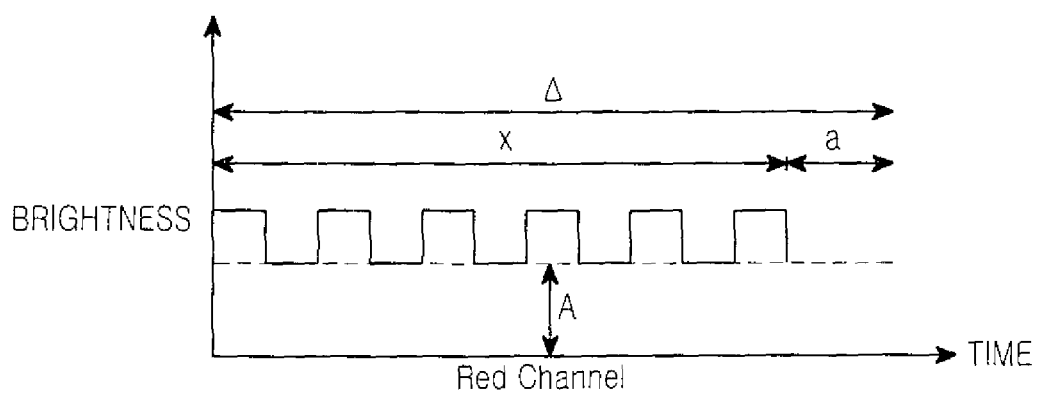
FIGS. 3A to 3C are graphs illustrating communication amount adjustment of each input data.
Figure 3B:
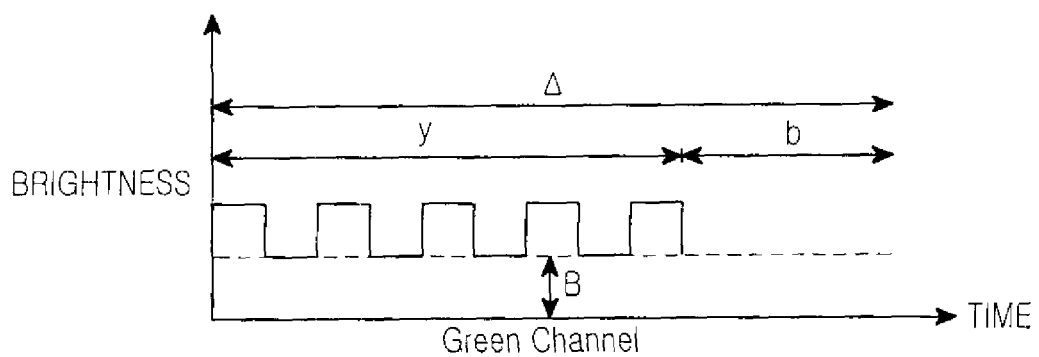
Figure 3C:
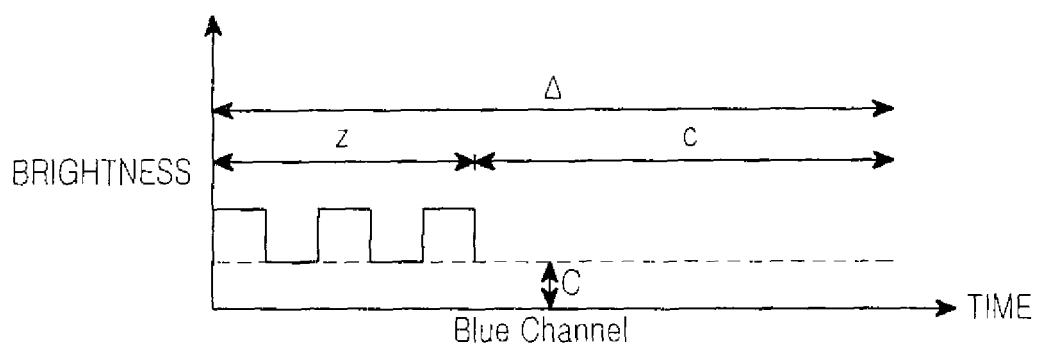

In step 133S, if the data rate measured in step 131S is lower than a specific pre-determined threshold value, a proper communication amount of data (Δ in FIGS. 3A to 3C) is determined based on the measured data rate. FIGS. 3A to 3C are graphs illustrating communication amount adjustment of each input data, in which Δ denotes a proper communication amount representing the total number of bits within a frame or a packet based on the channel transmitting the highest number of bits from among the transmitted channels. In FIGS. 3A to 3C, A, B, and C denote ratios of luminosity (brightness) of R, G, and B color necessary to emit white light, respectively.

In step 134S, the total number of bits (x, y, and z) for each of R, G, and B channel is measured.

In step 135S, the proper communication amount Δ determined in step 132S is compared with the total number of bits (x, y, and z) measured in step 133S. As a result of the comparison in step 135S, when the two values are identical to each other, the number of bits is transmitted to each of the modulators 110a to 110c without any additional handling (step 136S). When the two values are not identical to each other, the following process is performed.

In step 137S, the difference between the proper communication amount Δ and the total number of bits for each channel is calculated.

In step 138S, as many dummy bits as the bits (a, b, and c) calculated in step 137S are generated and then added to each of R, G, and B channel, and data having the added dummy bits are transmitted to the modulators 110a to 110c.

Referring back to FIG. 1, data of each channel having dummy data (dummy bits), added by the communication amount adjuster 130 for uniform distribution of communication amount, are modulated by the modulator 110a to 110c, according to an OOK scheme, a PPM scheme, etc. Then, the modulated data are provided as the driving signals of the LEDs of R, G, and B 120a to 120c. The LEDs of R, G, and B 120a to 120c emit R, G, and B light according to the driving signals provided from respective modulators 110a to 110c. In this case, the emitted light of R, G, and B has been adjusted by the communication amount adjuster 130 so that each channel has an equal communication amount. Therefore, the illuminator 120 emits white light. As described above, by applying the color balancing between each of R, G, and B channels by the communication amount adjuster 130, it is possible to perform visible light communication as well as an original function of illumination.

The white light emitted from the illuminator 120 is concentrated by the lens 211 of respective photoelectric converters 210a to 210c, and then only visible light having a wavelength corresponding to each of the R, G, and B colors passes through the optical filter 212, and the light having passed the filter is then converted into electrical signals by the photoelectric element 213. Each of the electrical signals is converted into bits by the demodulators 220a to 220c.

According to the above-described visible light communication apparatus of the present invention, it is possible to emit white light by resolving unbalancing between colors in visible light communication including a plurality of individual light sources. Therefore, the present invention enables an illuminator including a plurality of individual light sources to perform visible light communication as well as an original function of illumination.

While the invention has been shown and described with reference to a certain exemplary embodiment thereof, it will be understood by those skilled in the art that various changes in form and details may be made therein without departing from the spirit and scope of the invention as defined by the appended claims. Although the present invention is described taking an example of a light source formed by using R, G, and B LEDs, it is possible to form a light source by using various types of LEDs capable of emitting white light. In this case, data transmission is possible through multiple individual channels.

Therefore, the scope of the present invention should be defined not by the description of exemplary embodiments of the present invention, but by the appended claims and their equivalents.

What is claimed is:

1. A visible light communication apparatus for transmitting a plurality of communication data signals by using an illumination light, the visible light communication apparatus comprising:
    an illuminator for generation of the illumination light, the illuminator including a plurality of individual light sources with luminescence center wavelengths on mutually different visible regions;
    a communication amount adjuster for receipt of each of the plurality of communication data signals, and generation of a dummy data for a corresponding one of the plurality of individual light sources so that data to be transmitted through each of the plurality of light sources has an equal communication amount; and
    a modulator for receipt of each of the plurality of communication data signals and the dummy data generated therefor, and modulation of each of the received communication data signals and the received dummy data therefor into a driving signal for said each of the plurality of light sources, wherein a combination of the light sources generates a white light.

2. The visible light communication apparatus as claimed in claim 1, wherein the plurality of light sources includes a red LED, a green LED, and a blue LED.

3. The visible light communication apparatus as claimed in claim 1, further comprising:
    a photoelectric converter for receipt of the illumination light from the light sources; and
    a demodulator for demodulation of the plurality of communication data signals of the illumination light received by the photoelectric converter.

4. A visible light communication method for transmitting a plurality of communication data signals by using an illuminator including a plurality of individual light sources, the visible light communication method comprising the steps of:
    (1) adjusting a communication amount by adding dummy data to each input data to be transmitted using corresponding ones of the plurality of individual light sources as channels has an equal communication amount; and
    (2) modulating data of each channel and providing the modulated data as driving signals of corresponding ones of the plurality of individual light sources, wherein a combination of the plurality of individual light sources can emit a white light.

5. The visible light communication method as claimed in claim 4, wherein step (1) is performed only when a measured data rate of each input data to be transmitted by using the plurality of individual light sources is less than a specific pre-determined threshold data rate above which it is impossible to recognize the unbalancing of R, G, and B by the naked eye.

6. The visible light communication method as claimed in claim 5, wherein step (1) further comprises the steps of:
    determining a proper communication amount of each input data based on the measured data rate of each input data;
    measuring a real data amount of each input data to be transmitted by using the plurality of individual light sources as channels;
    directly transmitting data without any additional dummy data when a channel has the real data amount identical with the proper communication amount after a comparison of the real data amount with the proper communication amount; and
    transmitting data by addition of dummy data having the same amount as a difference between the real data amount and the proper communication amount to a channel when a channel has the real data amount different from the proper communication amount according to a comparison of the real data amount with the proper communication amount.

7. The visible light communication method as claimed in claim 4, further comprising the steps of receiving the illumination light comprising the plurality of communication data signals from the illuminator and demodulating each of the plurality of communication data signals of the illumination light.

8. A visible light communication apparatus for transmitting a plurality of communication data signals by using an illumination light, the visible light communication apparatus comprising:
    an illuminator for generation of the illumination light, the illuminator including a plurality of individual light sources with luminescence center wavelengths on mutually different visible regions;
    a communication amount adjuster for:
        receipt of each of the plurality of communication data signals,
        determination whether a measured data rate of each received data signal is less than a specific pre-determined threshold data rate; and
        generation for each of a dummy data so that data to be transmitted through each of the plurality of light sources has an equal communication amount, when the measured data rate is less than the threshold data rate; and
    a modulator for receipt of each of the plurality of communication data signals and the dummy data generated therefor, and modulation of each of the received communication data signals and the received dummy data therefor into a driving signal for said each of the plurality of light sources.

9. The visible light communication apparatus as claimed in claim 8, wherein the plurality of light sources includes a red LED, a green LED, and a blue LED.

10. The visible light communication apparatus as claimed in claim 8, further comprising:
    a photoelectric converter for receipt of the illumination light from the light sources; and
    a demodulator for demodulation of the plurality of communication data signals of the illumination light received by the photoelectric converter.

* * * * *